United States Patent [19]

Shikada et al.

[11] Patent Number: 5,432,629
[45] Date of Patent: Jul. 11, 1995

[54] LIGHT TRANSMISSION DEVICE CAPABLE OF STABLY TRANSMITTING A MODULATED OUTPUT LIGHT BEAM

[75] Inventors: Minoru Shikada; Arihide Noda, Tokyo, both of Japan

[73] Assignee: NEC Corporation, Tokyo, Japan

[21] Appl. No.: 5,552

[22] Filed: Jan. 19, 1993

[30] Foreign Application Priority Data

Jan. 17, 1992 [JP] Japan .................................. 4-6780
Apr. 13, 1992 [JP] Japan .................................. 4-92841

[51] Int. Cl.$^6$ ...................... H04J 14/02; H04B 10/04
[52] U.S. Cl. .................................... 359/124; 359/181; 359/187; 372/28; 372/29
[58] Field of Search ............... 359/124, 180, 181, 182, 359/183, 187; 372/28, 26, 29, 32

[56] References Cited

U.S. PATENT DOCUMENTS

| | | | |
|---|---|---|---|
| 4,700,352 | 10/1987 | Shikada et al. | 372/20 |
| 5,027,435 | 6/1991 | Chraplyvy et al. | 359/182 |
| 5,107,512 | 4/1992 | Shibutani | 372/32 |
| 5,170,274 | 12/1992 | Kuwata et al. | 359/183 |
| 5,228,043 | 7/1993 | Naito et al. | 357/187 |
| 5,247,382 | 9/1993 | Suzuki | 359/156 |

FOREIGN PATENT DOCUMENTS 0018133  1/1987  Japan .................................. 359/191

Primary Examiner—Leo H. Boudreau
Assistant Examiner—Rafael Barares
Attorney, Agent, or Firm—Sughrue, Mion, Zinn, Macpeak & Seas

[57] ABSTRACT

In a light transmission device operable in response to a sequence of input digital signals to produce an output light beam, a modulated light beam is produced from a laser device as a result of frequency shift keying carried out under a designed modulation index and is transmitted as the output light beam on one hand and is sent to a Fabry-Perot interferometer on the other hand to produce an optical output beam which has an output level deviated in dependence upon a variation of a modulation index relative to the designed modulation index. A feedback signal is fed back to a drive circuit which is supplied with the input signals and which is operable to control the laser device. The feedback signal serves to adjust the modulation index of the laser device to the designed modulation index. A controller may be included to control a central frequency of the output light beam by producing a bias signal which is added to the feedback signal.

4 Claims, 3 Drawing Sheets

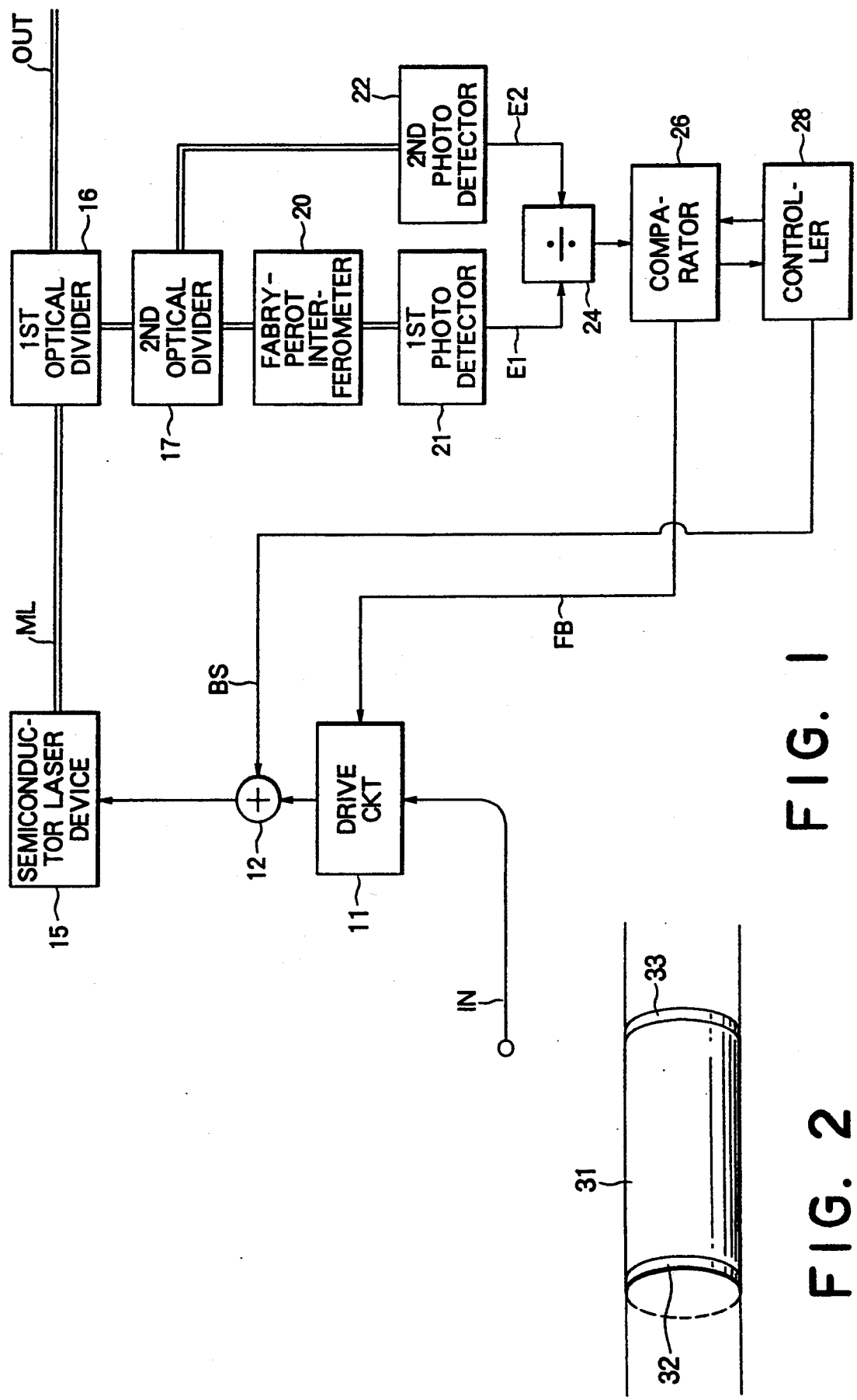

LIGHT TRANSMISSION DEVICE CAPABLE OF STABLY TRANSMITTING A MODULATED OUTPUT LIGHT BEAM

BACKGROUND OF THE INVENTION

This invention relates to a light transmission device for use in transmitting an output light beam by subjecting a sequence of digital signals to predetermined modulation, such as frequency shift keying, phase shift keying.

In a conventional light transmission device of the type described, a coherent light beam is modulated by a sequence of digital signals to be sent as an output light beam to an optical fiber. Such modulation may be, for example, frequency shift keying, phase shift keying. In any event, the light transmission device is excellent in view of a high speed modulation characteristic and a long distance transmission characteristic. In addition, the light transmission device can accomplish a very large capacity of communication. Under the circumstances, the light transmission device is therefore greatly expected as a next generation device and is considered about a wide spread use.

Herein, it is to be noted that the coherent light beam is modulated by the digital signal sequence with a modulation index.

In order to correctly receive the output light beam transmitted from the light transmission device, optical coherent detection or optical heterodyne detection is executed by a light reception device. To this end, the modulation index should not be varied with time but should be kept stable by the light transmission device. Thus, it is of importance to keep the modulation index stable in the light transmission device.

However, it is practically difficult either to stabilize or set the modulation index in the light transmission device or to stably control the modulation index.

SUMMARY OF THE INVENTION

It is an object of this invention to provide a light transmission device which is capable of stably controlling a modulation index which is used in modulation, such as frequency shift keying, phase shift keying, of an optical light beam.

It is another object of this invention to provide a light transmission device of the type described, wherein the modulation index is substantially kept stable on the modulation carried out by the light transmission device.

It is still another object of this invention to provide a light transmission device of the type described, which is suitable for controlling the modulation index in frequency shift keying.

A light transmission device to which this invention is applicable is operable in response to a sequence of digital signals to produce an output light beam subjected to a selected one of frequency shift keying and phase shift keying. According to this invention, the light transmission device comprises controllable modulating means supplied with a feedback signal and the digital signal sequence for carrying out the selected one of the frequency shift keying and the phase shift keying of the digital signal sequence with a predetermined modulation index to produce a modulated light beam, dividing means for dividing the output light beam into first and second partial modulated light beams, means for producing the first partial modulated light beam as the output light beam, and control signal producing means which is supplied with the second partial modulated light beam and which has a transmission characteristic such that a peak value appears at a preselected frequency determined by the predetermined modulation index. The control signal producing means is for producing a control signal which has an amplitude variable in dependency upon a deviation from the preselected frequency. In addition, the light transmission device further comprises feedback means coupled to the control signal producing means for feeding the control signal back to the controllable modulating means as the feedback signal.

BRIEF DESCRIPTION OF THE DRAWING

FIG. 1 is a block diagram of a light transmission device according to this invention;

FIG. 2 is a perspective view of a Fabry-Perot interferometer for use in the light transmission device according a first embodiment of this invention;

DESCRIPTION OF THE PREFERRED EMBODIMENT

Figure 3:
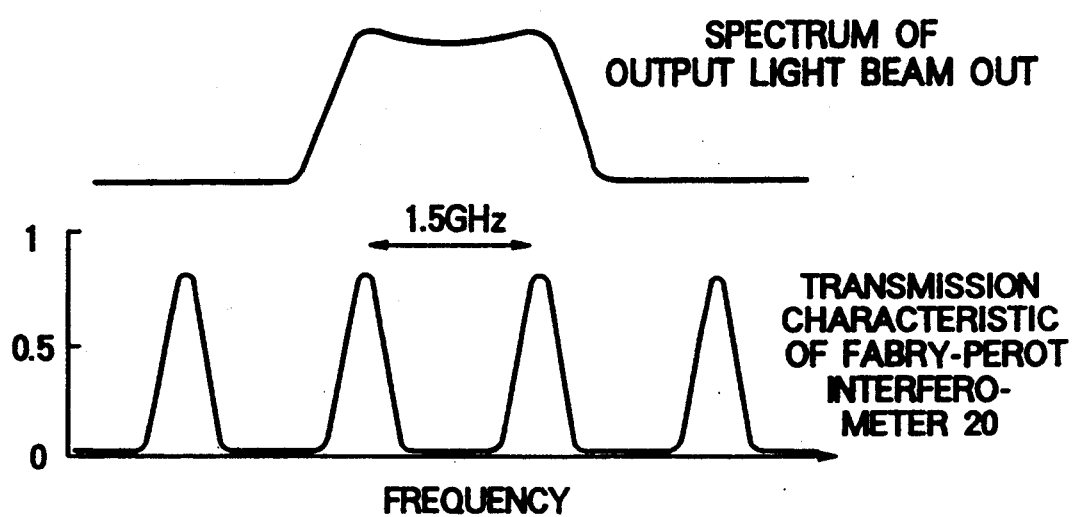
FIG. 3 shows a relationship between a spectrum of an output light beam and a transmission characteristic of the Fabry-Perot interferometer illustrated in FIG. 2.

Referring to FIG. 1, a light transmission device according to a first embodiment of this invention is operable in response to a sequence of input digital signals IN to produce an output light beam OUT subjected to frequency shift keying in the illustrated transmission device. The input digital signals IN are composed of binary bit signals. The illustrated output light beam is assumed to be modulated with a predetermined modulation index which is determined as a ratio of a frequency shift and a signal bit rate. In the illustrated example, it is assumed that a transmission bit rate is equal to 2 Gb/s while the frequency shift amount is equal to 1.5 GHz. In this connection, the modulation index is designed so that it becomes equal to 0.75.

More specifically, the input digital signal sequence IN is supplied to a drive circuit 11 which is controlled by a feedback signal FB, as will be later described, and which produces a controlled internal signal in accordance with the feedback signal FB. In the illustrated example, the controlled internal signal shows a variable peak value or amplitude determined by the feedback signal FB.

The controlled internal signal is delivered to an adder circuit 12 supplied with a bias current BS as will become clear and is added to the bias current BS by the adder circuit 12 to be sent to a semiconductor laser device 15 as a sum signal. In this example, the sum signal is given to the semiconductor laser device 15 in the form of a current signal. The semiconductor laser device 15 is driven by the sum signal to generate a modulated light beam ML subjected to frequency shift keying in accordance with the sum signal. As a result, the modulated light beam ML is frequency modulated with a designed modulation index of 0.75 by each binary bit of the input digital signals. In this connection, a combination of the drive circuit 11, the adder circuit 12, and the semiconductor laser device 15 may be referred to as a controllable modulating circuit for carrying out the frequency shift keying in response to the feedback signal FB and the input digital signal sequence IN to produce the modulated light beam ML.

The modulated light beam ML is sent to a first optical divider 16 to be optically divided into first and second divided modulated light beams both of which are identical with each other. The first optical divider may be implemented by a known optical element, such as a half mirror or the like. The first divided modulated light beam is produced through the first optical divider 16 as the output light beam OUT while the second divided modulated light beam is delivered to a second optical divider 17.

Thus, the first partial modulated light beam is sent as the output light beam OUT along an optical path to a light receiver (not shown). Therefore, it may be said that the optical path is operable to produce the first partial modulated light beam as the output light beam OUT.

On the other hand, the second divided modulated light beam is further optically divided into first and second additional modulated light beams. The first additional modulated light beam may be called a third divided modulated light beam and is sent through a Fabry-Perot interferometer 20 to a first photo detector 21 while the second additional modulated light beam may be called a fourth divided modulated light beam and is directly sent to a second photo detector 22. At any rate, the Fabry-Perot interferometer 20 is supplied with the third divided modulated light beam identical with the second divided modulated light beam.

Herein, it suffices to say that the Fabry-Perot interferometer 20 responds to the third divided modulated light beam and serves to produce, in a manner to be described later in detail, an optical output signal which has a peak value at a preselected frequency of, for example, 1.5 GHz and which has an amplitude dependent on a deviation of the preselected frequency.

The optical output signal and the fourth divided modulated light beams are delivered to the first and the second photo detectors 21 and 22 to be converted into first and second electric signals E1 and E2, respectively. The first and the second electric signals E1 and E2 are supplied to a division circuit 24.

In the division circuit 24, a division is carried out by dividing the first electric signal E1 by the second electric signal E2 to calculate a variation of the modulation index and to produce an index variation signal representative of the variation of the modulation index. Specifically, the first electric signal E1 has a variable amplitude not only when the modulation index is varied from the designed or preselected modulation index, namely, 0.75 but also when a level of the modulated light beam ML is varied independently of the modulation index. On the other hand, the second electric signal E2 is irrespective of the variation of the modulation index and is varied only in dependence upon the variation of the level of the modulated light beam ML. Under the circumstances, the division of the first electric signal E1 by the second electric signal E2 is effective to normalize the level of the modulated light beam ML and to normalize the variation of the modulation index from the first and the second electric signals E1 and E2. From this fact, it is readily understood that the index variation signal becomes regardless of the level of the modulated light beam ML.

In the illustrated example, the index variation signal is sent to a comparator 26 which is supplied with a reference index signal of 0.75 from a controller 28. The comparator 26 produces an error signal representative of a difference between the index variation signal and the reference index signal. The error signal is fed back to the drive circuit 11 as the feedback signal FB to control the peak value of the controlled internal signal sent from the drive circuit 11 and may therefore be called a control signal also.

In addition, the controller 28 supplies the adder circuit 12 with the bias signal BS to control a bias level of the semiconductor laser device 15 in a manner to be described. Thus, a combination of the comparator 26 and the controller 28 may be called a control circuit.

Figure 4:
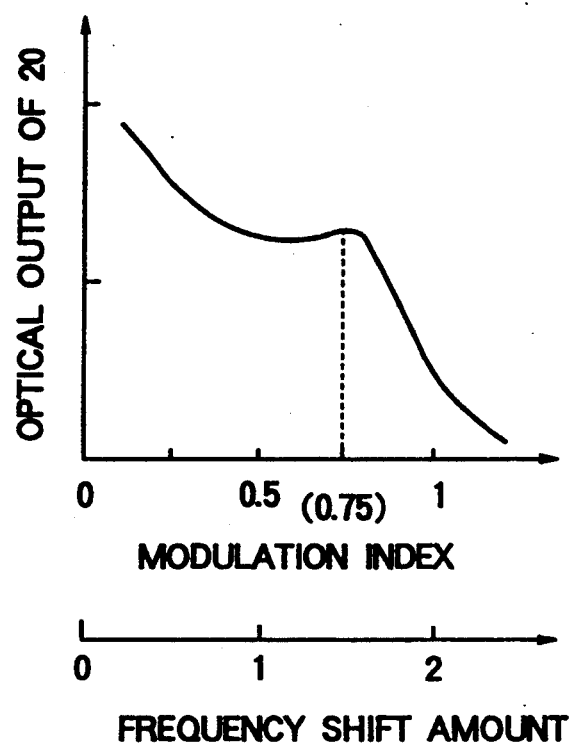
FIG. 4 shows a graph for use in describing a relationship between a modulation index and an optical output beam of the Fabry-Perot interferometer shown in FIG. 4.

Referring to FIGS. 2 through 4 together with FIG. 1, description will be made about the Fabry-Perot interferometer 20 for a better understanding of this invention. The illustrated Fabry-Perot interferometer 20 comprises an optical fiber 31 having a length of 7 cm and end surfaces opposite to each other and reflection films 32 and 33 coated on-the end surfaces of the optical fiber 31. The reflection films 32 and 33 are optically coupled to usual optical fibers (not shown). It is assumed that the Fabry-Perot interferometer 20 has a free spectral range of 1.5 GHz.

In FIG. 3, illustration is made about a relationship between a spectrum of the output light beam OUT and a transmission characteristic of the Fabry-Perot interferometer 20. As shown in FIG. 3, the spectrum of the output light beam OUT has-a frequency band which is greater than 1.5 GHz and which is defined by low and high edges contiguous to shoulders of the spectrum. The Fabry-Perot interferometer 20 is designed so that peak values of the transmission characteristic become substantially equal to the shoulders of the spectrum of the output light beam OUT. In other words, a central frequency (or a central wavelength) of the output light beam OUT is selected so that it is located between two adjacent ones of the peak values of the transmission characteristic in the Fabry-Perot interferometer 20.

In FIG. 4, the modulation index of the output light beam OUT is shown in relation to the optical output signal sent from the Fabry-Perot interferometer 20. As illustrated in FIG. 4, the optical output signal exhibits a local maximum value when the modulation index is equal to 0.75. This means that a frequency deviation or shift amount in the frequency shift keying is equal to 1.5 GHz, as illustrated along a lower scale in FIG. 4. In other words, the optical output signal takes the local maximum value when the frequency shift amount in the semiconductor laser device 15 is coincident with the free spectral range of the Fabry-Perot interferometer 20.

Specifically, the optical output signal of the Fabry-Perot interferometer 20 becomes small when the modulation index is smaller or greater than 0.75. Accordingly, it is possible to keep the modulation index at the preselected value, namely, 0.75 by monitoring the optical output signal of the Fabry-Perot interferometer 20. Taking the above into consideration, the drive circuit 11 is given the feedback signal FB so that the optical output signal of the Fabry-Perot interferometer 20 is adjusted to the local maximum value. In the illustrated example, a perturbation current of, for example, 50 Hz is superposed on the feedback signal FB to subtly vary the modulation index and to detect the local maximum value.

Turning back to FIG. 1, the controller 28 supplies the adder circuit 12 with the bias signal to control a bias level of the semiconductor laser device 15 and to locate the central wavelength of the output light beam OUT at an intermediate portion between the peak values illustrated in FIG. 3. To this end, the controller 28 supplies the bias current BS to the adder circuit 12 in the form of a small perturbation current which has a frequency of 250 Hz. Such a small perturbation current is superposed on the bias current BS supplied to the semiconductor laser device 15 to control the central wavelength of the output light beam OUT like the modulation index.

More particularly, it is to be noted that the optical output signal of the Fabry-Perot interferometer 20 becomes small in amplitude when the central wavelength of the output light beam OUT is deviated to either a long wavelength side or a short wavelength side. Therefore, it is possible to detect a deviation of the central wavelength in the output light beam OUT by monitoring a magnitude of the optical output signal or the index variation signal produced from the division circuit 24.

Thus, the modulation index and the central wavelength can be controlled by detecting the maximum values of the feedback signal FB and the bias current BS on which the small perturbation currents are superposed. Such maximum value control can be accomplished not only by a microprocessor but also by the use of a suitable hardware circuit.

In the example being illustrated, although only the two peak values are included in the spectrum of the output light beam, more than two peak values, namely, three or four peak values, may be included in the spectrum of the output light beam. However, it is to be noted that presence of more than two peaks makes it difficult to distinguish the local maximum value.

In this event, the central wavelength can be controlled by carrying out coherent detection of perturbation of the optical output beam sent from the Fabry-Perot interferometer 20, on the basis of a phase of the output light beam OUT even when the microprocessor may not be used in the illustrated transmission device.

Alternatively, an oscillator may be used to impress a small perturbation current onto the semiconductor laser device 15. With this structure, it is also possible to control the central wavelength of the output light beam OUT. In addition, it is possible to stably control the modulation index by locating another coherent detector after the Fabry-Perot interferometer 29 so as to add a secondary perturbation current to the drive circuit 11. With this structure, stabilization of the modulation index is possible by carrying out coherent detection of a perturbation component included in the optical output light beam sent from the Fabry-Perot interferometer 20.

In the above-mentioned example, although description is directed only to the frequency shift keying, the present invention is similarly applicable to phase shift keying.

At any rate, modulation may not be directly carried out in the semiconductor laser device 15 but may be carried out by the use of an external modulation device.

Figure 5:
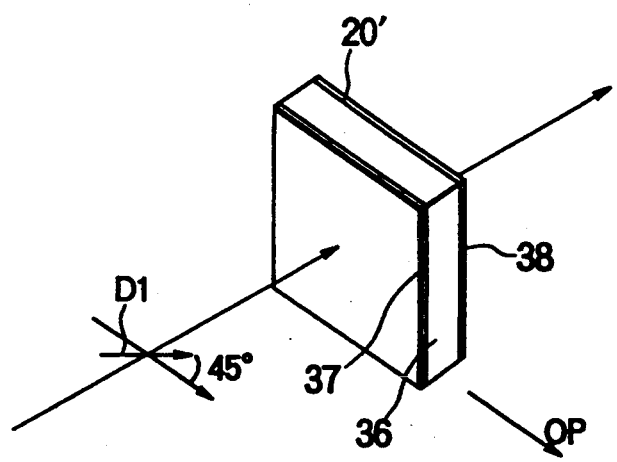
FIG. 5 is a perspective view of a Fabry-Perot interferometer for use in the light transmission device according to a second embodiment of this invention.

Referring to FIG. 5, a light transmission device according to a second embodiment of this invention is similar in structure and operation to that illustrated in FIG. 1 except that the second embodiment comprises a Fabry-Perot interferometer 20' which is somewhat different from that illustrated in FIG. 2. Accordingly, description will be mainly directed to the Fabry-Perot interferometer 20'.

The illustrated Fabry-Perot interferometer 20' comprises a calcite plate 36 which has an optical axis extended in a direction from a backward side towards a front side of FIG. 5, as depicted at OP. The calcite plate 36 has a thickness of 7 millimeters and first and second principal surfaces parallel to the optical axis. First and second high reflection films 37 and 38 are coated on the first and the second principal surfaces, respectively. An incident light beam, namely, the first additional modulated light beam may be assumed to be a linearly polarized light beam and is incident onto the first high reflection film 37 so that a plane of polarization of the first additional modulated light beam is inclined by an angle of 45 degrees relative to the optical axis direction OP, as symbolized by D1 in FIG. 5. The Fabry-Perot interferometer 20' has a free spectral range of about 15 GHz.

Figure 6:
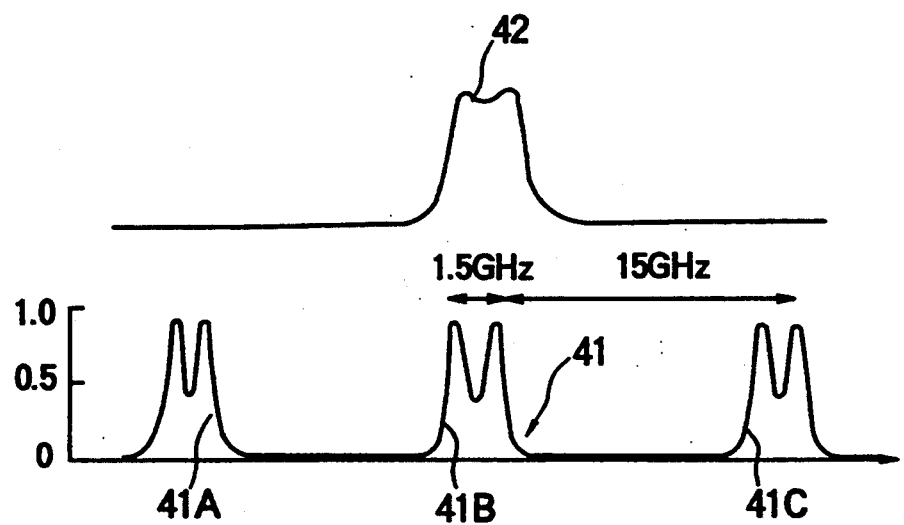
FIG. 6 shows a relationship between a spectrum of an output light beam and a transmission characteristic of the Fabry-Perot interferometer illustrated in FIG. 5.

Referring to FIG. 6 in addition to FIG. 5, the Fabry-Perot interferometer 20' has a transmission characteristic as depicted at 41 in FIG. 4. As shown in FIG. 6, the transmission characteristic has a plurality of transmission frequency regions 41A, 41B, and 41C which are spaced apart from one another by 15 GHz and each of which is specified by a bimodal characteristic having two transmission peaks.

Herein, it is to be noted that one of the transmission peaks results from a first polarization component of the first additional modulated light beam in the optical axis direction OP while another one of the transmission peaks results from a second polarization component of the first additional modulated light beam in a direction orthogonal to the optical axis direction OP. Both of the transmission peaks are remote from each other by a frequency difference of 1.5 GHz. As a result, the two transmission peaks are located with the frequency difference of 1.5 GHz left therebetween, as illustrated in FIG. 6.

On the other hand, it is assumed that the input digital signals IN have a transmission rate of 2 Gb/s while the modulation index becomes equal to 0.75 like in the first embodiment. Therefore, the output light beam OUT has a spectrum as shown by 42 in FIG. 6.

In the illustrated example, the spectrum 42 of the output light beam OUT is superposed on the frequency region 41B. In other words, the spectrum 42 of the output light beam OUT has high and low shoulders which are coincident with the transmission peaks of the frequency region 41B.

At any rate, the optical output signal of the Fabry-Perot interferometer 20' exhibits a local maximum value when the frequency shift amount of the output light beam OUT is coincident with each transmission peak, as already described with reference to FIG. 4. In the second embodiment also, the drive circuit 11 is driven by the feedback signal FB so that the frequency shift amount coincides with the local maximum value of the Fabry-Perot interferometer 20', like in the first embodiment.

Moreover, the central frequency or wavelength of the output light beam OUT is controlled so that it is adjusted to an intermediate frequency or wavelength between the two transmission peaks in the manner described in conjunction with FIG. 1.

In the second embodiment, circularly polarized light beam may be used instead of the linearly polarized light beams as mentioned in FIG. 5. In this event, a quarter wavelength plate should be located before the Fabry-Perot interferometer 20'.

In addition, the first and the second principal surfaces 37 and 38 may not be always parallel to each other relative to the optical axis direction illustrated in FIG. 6 but may be positioned relative to the optical axis direction so that two transmission peaks separately appear in the optical light beam sent from the Fabry-Perot interferometer 20'.

While this invention has thus far been described in conjunction with a few embodiments thereof, it will readily be possible for those skilled in the art to put this invention into practice in various other manners. For example, it is possible to use another birefringent optical crystal plate than the calcite plate of the optical fiber. A modulator may be placed outside of the semiconductor laser device to supply a modulated light beam to the semiconductor laser device. Furthermore, the semiconductor laser device may be replaced by any other laser devices. Moreover, the Fabry-Perot interferometer 20 or 20' may be replaced by an optical element which can produce an optical output beam which is variable in dependence upon the modulation index.

What is claimed is:

1. A light transmission device operable in response to a sequence of digital signals to produce an output light beam subjected to a selected one of frequency shift keying and phase shift keying, said light transmission device comprising:

controllable modulating means supplied with a feedback signal and said digital signal sequence for carrying out said selected one of the frequency shift keying and the phase shift keying of said digital signal sequence with a predetermined modulation index to produce a modulated light beam;

dividing means for dividing said modulated light beam into first and second modulated light beam;

means for producing said first modulated light beam as said output light beam;

control signal producing means which is supplied with said second modulated light beam and which has a transmission characteristic such that a peak value appears at a preselected frequency determined by said predetermined modulation index, said control signal producing means being for producing a control signal which has an amplitude variable in dependency upon a deviation from said preselected frequency; and feedback means coupled to said control signal producing means for feeding said control signal back to said controllable modulating means as said feedback signal;

said control signal producing means comprising:

a Fabry-Perot interferometer responsive to said second modulated light beam for producing an optical output signal which has said peak value at said preselected frequency and which is varied in amplitude dependent on said deviation from the preselected frequency;

optical signal producing means supplied with said second modulated light beam for producing a third modulated light beam substantially equivalent to said second modulated light beam;

calculating means coupled to said optical signal producing means and said Fabry-Perot interferometer for carrying out a predetermined calculation between said optical output signal sent from said Fabry-Perot interferometer and said third modulated light beam to produce said control signal; and signal supplying means for supplying said control signal to said feedback means.

2. A light transmission device as claimed in claim 1, said predetermined calculation being a division, wherein said calculating means comprises:

division means for dividing said optical output signal by said third modulated light beam to produce a division signal representative of a result of the division between said optical output signal and said third modulated light beam;

reference signal generating means for generating a reference signal representative of a reference value for said result of the division;

comparing means supplied with said division signal and said reference signal, for comparing said division signal with said reference signal to produce a comparison result signal representative of a result of the comparison between the division signal and said reference signal;

means for supplying said signal supplying means with said comparison result signal as said control signal.

3. A light transmission device as claimed in claim 1, wherein said Fabry-Perot interferometer comprises:

an optical element having first and second end surfaces opposite to each other and a predetermined length between said first and said second end surfaces; and first and second reflection films coated on said first and said second end surfaces, respectively.

4. A light transmission device as claimed in claim 1, wherein said Fabry-Perot interferometer comprises:

a birefringent crystal plate having an optical axis and first and second principal surfaces opposite to each other and parallel to said optical axis; and first and second reflection layers coated on said first and said second principal surfaces;

said second modulated light beam having a plane of polarization inclined at an angle of 45 degrees relative to said optical axis of the birefringent crystal plate.

* * * * *